United States Patent Office 3,726,698
Patented Apr. 10, 1973

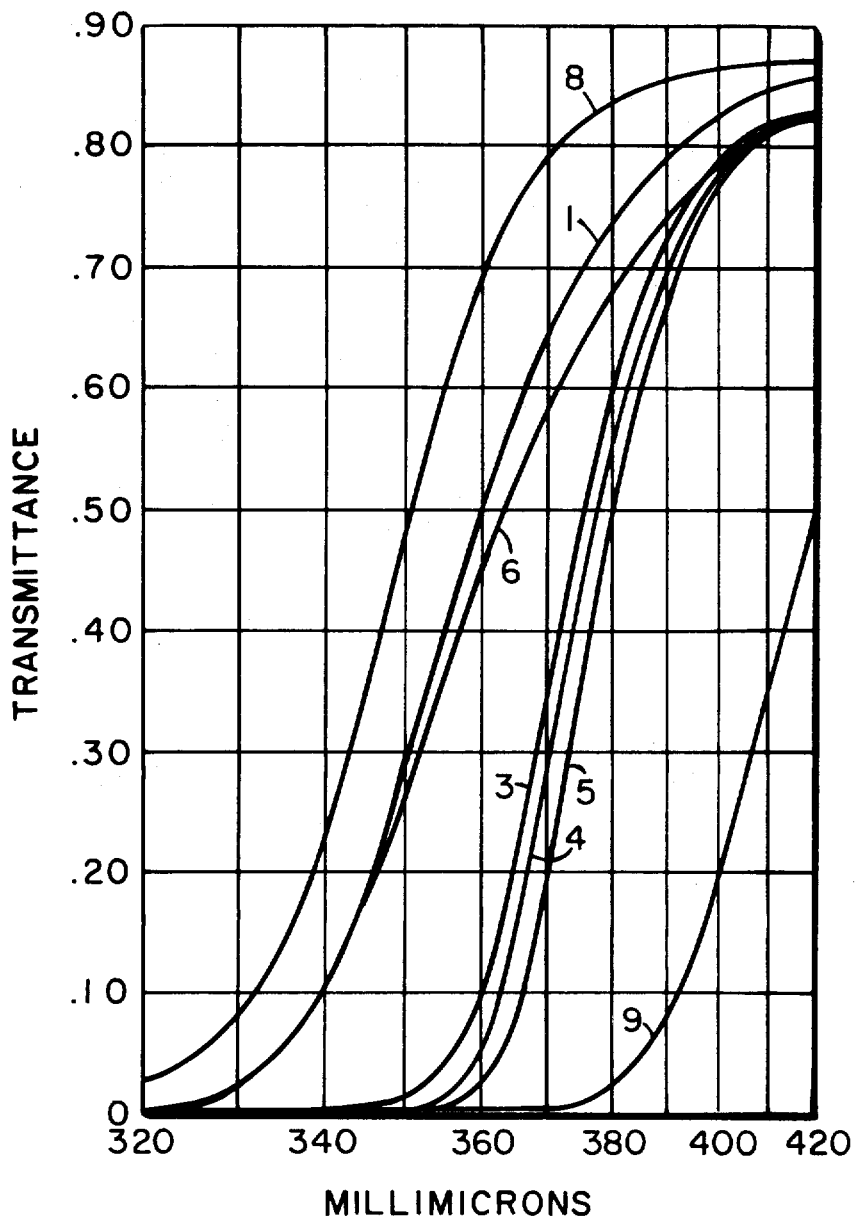

3,726,698
OPTICAL GLASS WITH CONTROLLED
ULTRAVIOLET TRANSMISSION
George B. Hares and David W. Morgan, Corning, N.Y.,
assignors to Corning Glass Works, Corning, N.Y.
Filed Jan. 21, 1971, Ser. No. 108,328
Int. Cl. C03c 3/08
U.S. Cl. 106—54                                          3 Claims

ABSTRACT OF THE DISCLOSURE

This invention relates to crown glasses wherein the cut, i.e., the wave length limits within which must lie the wave length at which the transmittance is 37%, can be adjusted to wave lengths between about 3500 A.–3900 A. These glasses consist essentially, by weight on the oxide basis, of about 0.1–5% $CeO_2$, 0.5–5% $La_2O_3$, 5–10% ZnO, 15–22% $B_2O_3$, 15–23% $SiO_2$, and 43–50% BaO.

---

The development of glass filters which cut off radiations shorter than some critical wave lengths, but passing all longer wave length radiation until far out into the infrared portion of the spectrum has been a continuing effort for many years. Hence, for example, a glass filter suitable for a sun lamp will exhibit high transmission at wave lengths of 3000 A. and longer but very little at wave lengths shorter than 2500 A. In this manner such a glass will transmit the tanning and therapeutic ultraviolet radiation while cutting off the shorter wave lengths. Also, a number of glasses has been developed which will demonstrate a cut-off on the long wave side as well. Nevertheless, for the most part these latter glasses do not exhibit suitable characteristics for lamp bulbs but have been utilized extensively for filters.

U.S. Pat. No. 3,478,662 discloses achromatized lens systems useful in photographic applications. Such lens systems can be fabricated through the combination of a crown glass element and a flint glass element. The instant invention is concerned with the development of a crown glass element particularly suitable for such lens systems wherein the transmission of ultraviolet radiation therethrough can be carefully controlled without changing the optical properties thereof.

For application in the above-defined lens systems, the cut of the glass, i.e., the wave length limits within which must lie the wave length at which the transmission is 37%, can be adjusted to between 3500 A.–3900 A. The sharpness of the cut, defined as the difference between the wave lengths where the transmittance is 15% and 60%, must also be closely defined to insure optimum performance of a photographic film employed in the achromatized lens system described above. Thus, in the glasses of the present invention the sharpness of the cut optained varies from about 150 A. at 3500 A. to 300 A. at 3900 A. Also, desirably for use in the said lens system, the index of refraction of the glasses will lie between about 1.64–1.68 with a nu value between about 52 and 57.

We have discovered that glasses possessing the above-required characteristics can be produced from compositions consisting essentially, in weight percent on the oxide basis, of about 43–50% BaO, 15–23% $SiO_2$, 15–22% $B_2O_2$, 5–10% ZnO, 0.1–5% $CeO_2$, and 0.5–5% $La_2O_3$.

The appended drawing reports transmission curves through flat lenses approximately 1 mm. in thickness prepared from glasses of the instant invention. The drawing also records transmission curves exhibited by glasses having compositions similar to, but outside of, the ranges found critical to the present invention.

The following table recites exemplary compositions, expressed in weight percent on the oxide basis, of glasses falling within the ranges suitable for the instant invention and also of other glasses having compositions similar to, but outside of, the ambit of the present invention. The actual batch ingredients may comprise any materials either oxides or other compounds, which, on being melted together, will be transformed to the desired oxides in the proper proportions. The batches were melted overnight in open platinum crucibles at about 1400°–1500° C. Thereafter, the melts were poured onto a steel plate to form a circular glass patty about 5″ in diameter and ⅜″ in thickness. The patties were then immediately transferred to an annealer operating at about 600° C. After visual examination of the patties for glass quality, circular lenses about 2″ in diameter and 1–2 mm. in thickness were cut, ground, and polished therefrom. Indices of refraction were determined and transmission curves were drawn on individual examples utilizing conventional measurement techniques.

TABLE I

| Example | 1 | 2 | 3 | 4 | 5 | 6 | 7 | 8 | 9 |
|---|---|---|---|---|---|---|---|---|---|
| $SiO_2$ | 19.8 | 19.3 | 22.0 | 19.0 | 20.0 | 20.0 | 19.8 | 20.0 | 18.0 |
| $B_2O_3$ | 19.9 | 19.9 | 16.5 | 19.0 | 17.5 | 17.9 | 19.9 | 17.8 | 16.0 |
| $Al_2O_3$ | 1.0 | 1.0 | | | | | 1.0 | | |
| $Na_2O$ | 0.15 | 0.15 | | | | | | | |
| CaO | 1.0 | 1.0 | 2.0 | | 1.0 | | 1.0 | | |
| BaO | 47.4 | 47.15 | 50.0 | 50.0 | 49.0 | 48.0 | 46.2 | 48.0 | 58.0 |
| ZnO | 8.5 | 8.5 | 7.0 | 5.0 | 8.0 | 8.0 | 8.5 | 7.0 | 5.0 |
| $La_2O_3$ | 1.8 | 1.0 | 0.5 | 1.0 | 0.5 | 5.0 | 0.8 | 6.0 | 2.0 |
| $ZrO_2$ | 1.0 | 1.0 | 1.0 | | | 1.0 | 1.0 | 1.0 | |
| $CeO_2$ | 0.125 | 0.8 | 0.8 | 5.0 | 3.0 | 0.1 | 3.0 | 0.1 | 0.8 |
| $Sb_2O_3$ | | 0.2 | 0.2 | 1.0 | 1.0 | | 0.5 | 0.1 | 0.2 |
| $S$ | 1.647 | 1.651 | 1.649 | 1.657 | 1.649 | 1.653 | 1.652 | 1.649 | 1.663 |

An examination of the glass compositions reported in the above table in conjunction with the transmission curves depicted in the appended drawing unequivocally demonstrates the criticality of composition in assuring the development of glasses exhibiting the demanded cut-off and sharpness of cut. Hence, Examples 3, 4 and 5 illustrate very desirable measurements of these properties whereas Examples 8 and 9, although having compositions in close approximation to those required in the present invention, do not demonstrate the proper characteristics of cut-off and/or sharpness of cut. Finally, Examples 1 and 6 exhibit transmission properties narrowly within the specifications demanded for the invention and thereby act to practically delineate borderline glass compositions. Thus, both the actual cut-off and the sharpness of cut are marginal at best.

Thus, the recited ranges of BaO, $SiO_2$, $B_2O_3$, ZnO, $CeO_2$, and $La_2O_3$ are vital to the operability of the invention. Nevertheless, additions of such compatible metal oxides as $Al_2O_3$, $Na_2O$, $K_2O$, CaO, SrO, MgO, $ZrO_2$, $As_2O_3$, and $Sb_2O_3$ can be tolerated up to about a total of 10% by weight. In general, except in the cases of $As_2O_3$ and $Sb_2O_3$, individual amounts of up to about 5% of these oxides can be utilized. However, amounts of $As_2O_3$ and $Sb_2O_3$ in excess of about 1% by weight have an adverse effect upon glass quality.

The mechanism leading to the definitive control of ultraviolet transmission in these glasses is believed to be the result of the network structure present due to the utilization of $La_2O_3$ in the composition. Hence, the presence of $La_2O_3$ is thought to favor the presence of cerium as $Ce^{+3}$, the oxidation state thereof producing the desired absorption. Experience has shown that the effect of $Ce_2O_3$ on the optical properties of the glass is nearly identical to that exhibited by $La_2O_3$. This permits the ultraviolet cut to be adjusted with simple $Ce_2O_3$ substitutions for $La_2O_3$ without changing the essential optical properties.

In terms of cut-off and sharpness of the cut as well as excellence of glass quality, the preferred glass compositions lie within the following ranges, in weight percent on the oxide basis: 45–48% BaO, 17–21% $SiO_2$, 17–21% $B_2O_3$, 6–9% ZnO, 0.1–3% $CeO_2$ and 0.5–3% $La_2O_3$. Example 3 is particularly ideal for use in the achromatized lens system described above.

We claim:

1. A crown glass exhibiting a nu value between about 52 and 57, an index of refraction between about 1.64–1.68, and having an ultraviolet cut between 3500–3900 A. and a sharpness of cut ranging between about 150 A. at 3500 A. to 300 A. at 3900 A. consisting essentially, by weight on the oxide basis, of about 43–50% BaO, 15–23% $SiO_2$, 15–22% $B_2O_3$, 5–10% ZnO, 0.1–5% $CeO_2$, and 0.5–5% $La_2O_3$.

2. A crown glass according to claim 1 consisting essentially, by weight on the oxide basis, of about 45–48% BaO, 17–21% $SiO_2$, 17–21% $B_2O_3$, 6–9% ZnO, 0.1–3% $CeO_2$, and 0.5–3% $La_2O_3$.

3. A crown glass according to claim 1 further containing a compatible metal oxide selected from the group consisting of $Al_2O_3$, $Na_2O$, $K_2O$, SrO, CaO, MgO, and $ZrO_2$ in an amount not exceeding about 5% by weight each and still further containing $As_2O_3$ and/or $Sb_2O_3$ in an amount not exceeding about 1% by weight total, the sum of $Al_2O_3$, $Na_2O$, $K_2O$, SrO, CaO, MgO, $ZrO_2$, $As_2O_3$, and $Sb_2O_3$ not exceeding about 10% by weight of the total composition.

References Cited

UNITED STATES PATENTS

| | | | |
|---|---|---|---|
| 2,523,362 | 9/1950 | Fraser et al. | 106—54 X |
| 2,964,427 | 12/1960 | Rheinberger et al. | 350—2 X |
| 3,671,277 | 6/1972 | Ohno et al. | 106—47 Q |
| 3,326,703 | 6/1967 | Harrington | 106—54 |
| 3,499,775 | 3/1970 | Albinak et al. | 106—54 |
| 3,248,238 | 4/1966 | Faulstich | 106—54 |

FOREIGN PATENTS

| | | | |
|---|---|---|---|
| 1,153,600 | 5/1969 | Great Britain | 106—54 |

HELEN M. McCARTHY, Primary Examiner

U.S. Cl. X.R.

252—300